Figure 3:
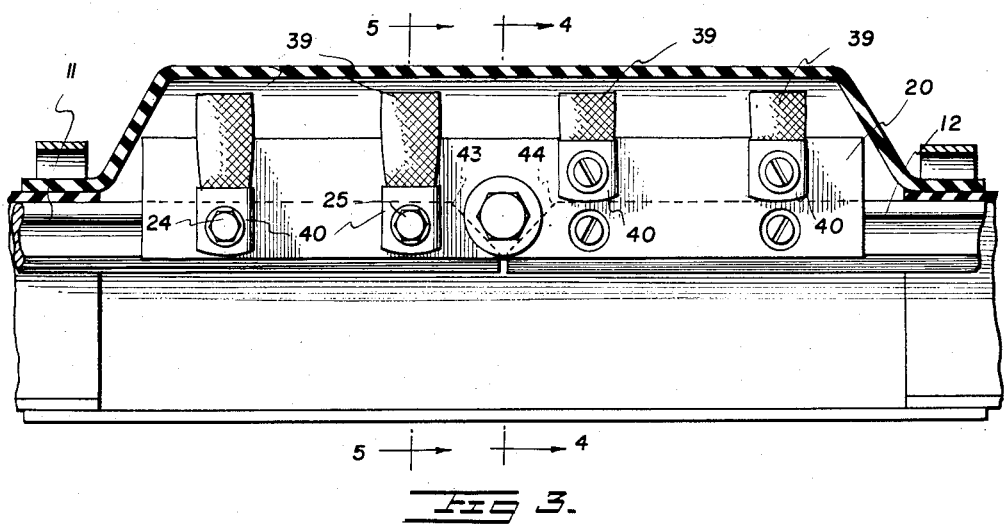

Feb. 9, 1960  A. B. TAYLOR  2,924,674
ELECTRICAL TROLLEY SYSTEM
Filed Sept. 11, 1953  3 Sheets-Sheet 1
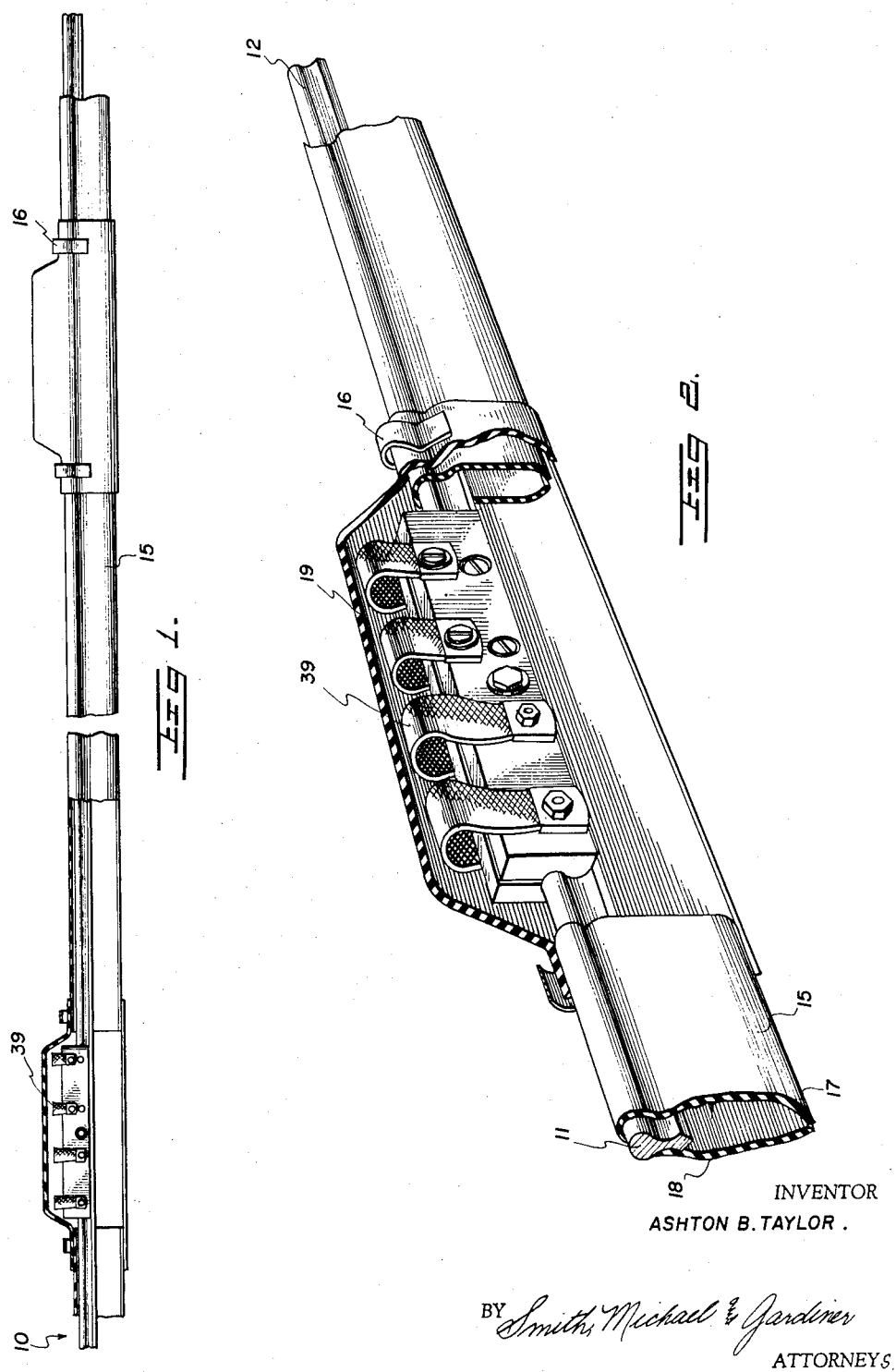
INVENTOR
ASHTON B. TAYLOR.
BY *Smith, Michael & Gardiner*
ATTORNEYS Feb. 9, 1960 A. B. TAYLOR 2,924,674
ELECTRICAL TROLLEY SYSTEM
Filed Sept. 11, 1953 3 Sheets-Sheet 2

INVENTOR
ASHTON B. TAYLOR.

BY *Smith, Michael & Gardiner*
ATTORNEYS.

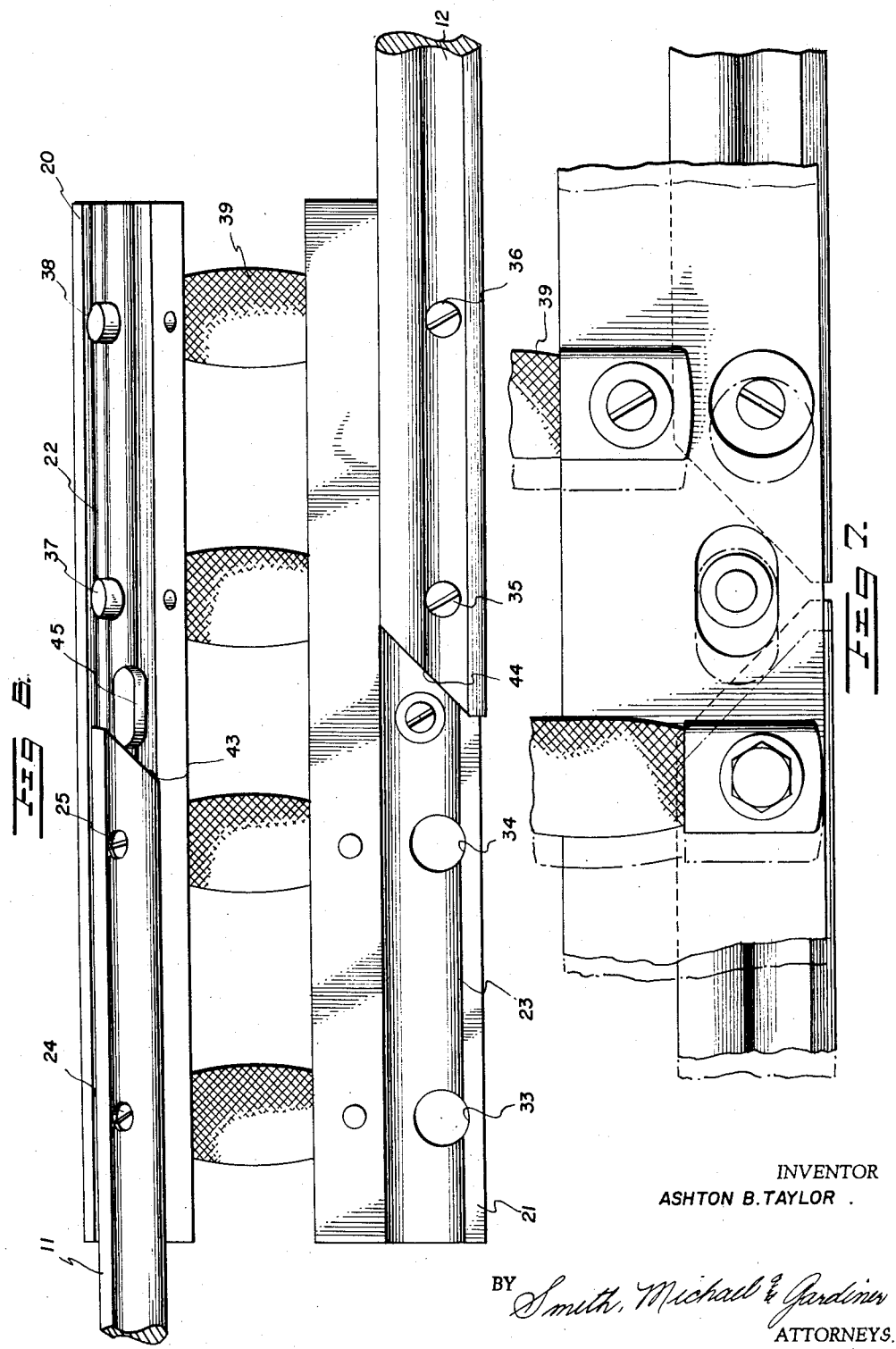

United States Patent Office 2,924,674
Patented Feb. 9, 1960

2,924,674

ELECTRICAL TROLLEY SYSTEM

Ashton B. Taylor, Pittsburgh, Pa.

Application September 11, 1953, Serial No. 379,548

5 Claims. (Cl. 191—44.1)

This invention relates to electrical trolley systems such as are used in steel mills, manufacturing plants and other industrial installations where mobile carriages are used that are moved from place to place while electrical energy is supplied to them from an overhead trolley.

More particularly this invention relates to a trolley system in which rigid bus bars are used as trolleys and while the present invention is admirably adapted for use with a bus bar and collector shoe such as shown in my application Serial No. 301,416, filed July 28, 1952, it is capable of use with various types of bus bars and collector shoes and is not to be restricted to use with any particular bus bar or collector shoe.

In present day trolley systems which are used in industrial plants, it is not uncommon that the trolley extends for a distance of hundreds or even thousands of feet, and in such installations, difficulties have been encountered due to contraction and expansion of the supporting structures with consequent strain on the bus bar conductors which cause fracture, warping or other distortions of the bus bar with the result that the collector shoe cannot consistently maintain satisfactory contact with the bus bar.

It is an object of the present invention to overcome these difficulties by providing highly efficient expansion joints spaced at a plurality of points along the conductor run and it has been found that such a joint for every 10 feet of conductor bus which provides for substantially ⅛ inch contraction and expansion will give satisfactory results.

Another object of the present invention is to provide an expansion joint which at all times maintains the ends of adjacent sections of the bus bar in true alignment both vertically and horizontally while at the same time, permitting proper contraction and expansion.

A further object is to provide an expansion joint which enables the ends of adjacent sections to be brought together as closely as possible and thereby eliminate large gaps between sections.

Still another object is to provide an expansion joint in which the full capacity of the conduct bus is conducted between the sections of bus bar so that the conductor is at full capacity throughout its length.

An additional object is to provide an expansion joint in which a single means is employed to yieldingly clamp the adjacent ends of the conductor bus in vertical and longitudinal alignment and to insure intimate contact between the clamping plates and conductor bus throughout the length of the plates while permitting contraction and expansion.

A still further object is to insure complete contact between the clamping plates and conductor bus by forming the faces of the plates which contact the conductor bus with the same contour as that of the bus bar and to insure full transfer of current from one section to another by means of a plurality of flexible shunt wires which may be of braided or other form and which straddle the plates when in assembled relation.

Other objects and advantages will be evident from the following description taken in connection with the accompanying drawings, and it is to be understood that changes in materials, finish, dimensions and the like may be resorted to so long as they fall within the scope and spirit of the appended claims.

Figures 4, 5:
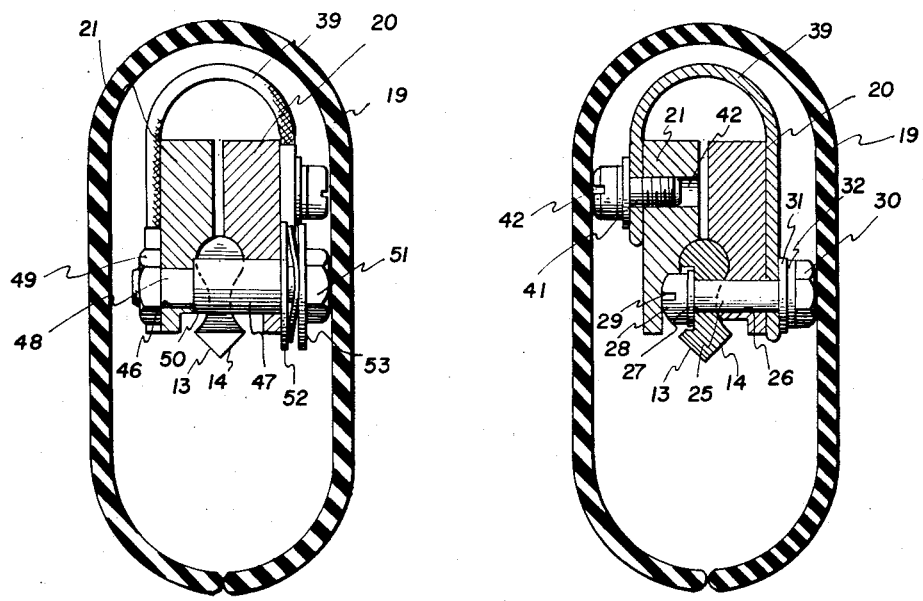

Referring now to the drawings:

Fig. 1 is a side elevation of a portion of a conductor bus bar run, having parts in section to show one of the expansion joints, Fig. 2 is a fragmentary view partially in section and on an enlarged scale to show the joint in more detail, Fig. 3 is a fragmentary side elevation of the expansion joint, the shield being in section, Fig. 4 is a sectional view along the line 4—4 of Fig. 3, Fig. 5 is a sectional view along the line 5—5 of Fig. 3, Fig. 6 is a view of the expansion joint in separated condition to more clearly show details of construction, and Fig. 7 is a fragmentary side elevation illustrating the construction and expansion obtainable.

More in detail, the present invention relates to an overhead trolley system embodying a bus bar conductor generally indicated at 10 and which is composed of a plurality of sections such as 11 and 12 to provide a conductor of any length desired.

The conductor bus shown is preferably composed of copper or copper alloy, but may be of steel or any good conducting metal and has what is known in the trade as a figure 8 cross section except that its lower edge has downwardly converging faces 13 and 14 forming a V for the purpose of receiving a complementary shaped sliding shoe similar to that shown in my application referred to above.

The conductor bus 10 is shielded throughout its length by a flexible insulating shield 15 which is clamped to the conductor bus by clips 16 and has depending portions 17 and 18 which are free to flex as the collector shoe passing along between the ends thereof as is well known in the art. A similar shield 19 surrounds the expansion joint and is clamped to the shield 15 by means of the same clips 16.

The expansion joints consist of two clamping plates 20 and 21 of copper, copper alloy or other conducting metal, the inner faces of which are complementary to the exterior faces of the bus bar sides so as to intimately contact the bus bar sections throughout the length of the plates thereby insuring transfer of full current from one section to another.

From an inspection of Figure 6, it will be seen that clamping plate 20 is carried on the outer face of bus bar section 11 and has a portion 22 projecting beyond the end of the bus bar section 11 so as to overlap the end of bus bar section 12 when in assembled relation and that the plate 21 is carried on the outside of the adjacent end of the bus bar section 12 and has a projecting portion 23 so as to overlap the adjacent end of bus bar section 11.

It will be noted that the projecting portions 22 and 23 of the plates are approximately as long as the portions secured to the bus bar sections 11 and 12 so that when assembled the joint lies approximately midway between the ends of the clamping plates so that pressure on opposite sides of the bus bar sections will be the same.

The clamping plates are secured to the bus bar sections by means of bolts in the form shown, but it is to be understood that they may be spot welded or otherwise secured thereto, so long as a firm connection is made.

As illustrated in Figure 6, the plate 20 is secured to the bus bar section 11 by a pair of bolts 24 and 25 passing through openings 26 in the plate and openings 27 in the bus bar. The bolts are provided at one end with a head 28 having a kerf 29 (Fig. 5) therein for operation by a screw driver. The other end of the bolt is threaded for the reception of a tightening nut 30 backed up by a washer 31 and a spring washer 32 to prevent the bolt from being loose in use.

The clamping plate 21 carried by the bus bar section 12 is provided in the overlapping portion 23 with a pair of enlarged openings 33 and 34 which, when the clamping plates are in assembled relation, align with and receive the bolt heads 28 therein so that access to the bolt heads 28 may be had through the openings.

Similarly, the clamping plate 21 is secured to the bus bar section 12 by headed bolts 35 and 36 received in enlarged openings 37 and 38 in the clamping plate 20 and since the connectors are identical with those already described no further description is needed.

The present system is primarily intended to carry load of large capacity and in order to insure full capacity transfer from section to section of the bus conductor there are provided a plurality of shunt wires for electrically connecting the bus bar sections together.

As shown, the shunt wires consist of relatively wide, flexible braids 39 of good conducting material, preferably copper, which are connected to a clamping plate on one side of the bus bar, then extend over the plate and bus bar so as to leave the lower edge thereof unobstructed, and then over the plate at the other side of the bus bar where they are connected thereto. Since the clamping plates are carried by their respective bus bars, it will be seen that continuity of flow of current at full capacity is obtained.

There are four shunt wire braids shown, but it is to be understood that the number, size and load carrying capacities will vary depending upon the load for which the system is designed.

As shown, the shunt braids are arranged in pairs, and are oppositely connected to the bus bar sections and clamping plates. That is to say, the two braids shown at the left in Fig. 3 are connected to the bus bar section 11, then extend over the same and are connected to the projecting portion 23 of the plate 21 whereas the two braided shunts at the right in Fig. 3 are connected to the bus bar section 12 and to the projecting portion 22 of the plate 20.

The braids are all provided at their ends with metallic ferrules 40 having apertures therein to receive bolts for connecting them to the clamping plates. It will be clear from the drawings that the ends of one pair of braided shunts are connected to their clamping plate by the bolts 25 which also connect the clamping plates to the bus bar and that their other ends are connected to the opposite clamping plate by means of bolts 41 threaded into apertures 42 in this plate. The bolts 41 have kerfed heads thereon as at 42 and are backed up by a washer and spring washer as described in connection with bolts 25.

As described so far, the clamping plates and braided shunts are connected to provide the necessary flow of current between bus bar sections, but unless provision is made for contraction and expansion of the bus bar sections injury and failure will occur.

To overcome this condition, the clamping plates 20 and 21 are held together by yielding pressure so that relative movement between the plates and accordingly the bus bar sections can take place.

In Figures 3 and 6, it will be noted that the adjacent ends of the bus bar sections are bevelled as at 43 and 44 so as to diverge from each other thereby leaving a relatively wide space between the ends at one edge thereof whereas at the other edge the adjacent ends are close together. The purpose for this space is to accommodate means for forcing the clamping plate together and to so locate this means that it is in alignment with the bus bar sections so that the clamping force is applied at the bus bars instead of being applied at one side thereof. This insures intimate contact between the bus bars and plates and perfect alignment of the bus bar sections laterally. Due to the complemental inner faces on the clamping plates and bus bar sections, it will be seen that these sections are drawn into alignment vertically thereby eliminating objectionable steps between sections.

The means for yieldingly holding the clamping plates together is shown in detail in Fig. 4. As stated, the means for forcing the clamping plates together is located between the ends of the bus bar sections and to this end, one of the clamping plates is provided with an elongated, horizontal opening 45 in alignment with the space between the ends of the bus sections and the other clamping plate is provided with an aperture 46 aligned with the elongated opening 45.

Extending through said opening and aperture is a bolt or stud 47 provided with a reduced threaded end 48 for the reception of a nut 49, the reduced end forming a shoulder 50 which is forced against the side of the clamping plate 21 when the nut is tightened.

At the opposite end, bolt or stud 47 also has a reduced portion threaded to receive a clamping nut 51 threaded thereon. Surrounding the bolt 47 is a washer 52 bearing against the face of the clamping plate 20. Another washer 53 surrounds the reduced end of the bolt and bears against the nut 51 and between the washers 52 and 53, there is provided a spring washer 54 which is compressed as the nut 51 is tightened to produce a yielding pressure between the clamping plate and of course, the degree of pressure can be adjusted so that while the clamping plates are free to move relative to each other, there is sufficient pressure on the plates to maintain them at all times in proper alignment and consequently hold in bus bar sections in proper operating position.

From the foregoing, it will be seen that the present invention provides a trolley system that is very effective, efficient, easy and inexpensive to manufacture and install and which overcomes objections of prior systems while insuring full load capacity throughout the bus bar run and enabling the run to contract and expand without failure, fracture or misalignment of the sections either vertically or horizontally.

I claim:

1. In a trolley system including a bus bar comprising, elongated, rigid bus bar sections each having a longitudinally extending trolley running surface portion, an expansion joint between said sections for maintaining the bus bar sections in spaced end-to-end relation and in longitudinal alignment, with the trolley running surface portions thereof in substantially coplanar relation, said joint comprising a rigid clamping plate having one end secured to one side of the end of one section only of the bus bar and a second rigid clamping plate having one end secured to the opposite side of the adjacent end of an adjacent section of bus bar, the opposite ends of said plates being free and overlapping the space between said sections and slidingly engaging the corresponding sides of said sections, means bearing against said plates for resiliently urging the same transversely toward each other to force the free ends of the plates into engagement with the sides of the sections and shunt wires connecting said plates together, said means comprising a stud rigidly secured to one of said clamping plates and passing through the space between adjacent ends of adjacent bus bar sections, the other of said clamping plates being provided with an aperture, said stud passing through the aperture in said other clamping plate, a crimped spring washer mounted on said stud between the outer terminal portion thereof and the adjacent face of said other clamping plate, flat washers mounted on the stud on opposite sides of said crimped spring washer and a nut in threaded engagement on the end of the stud for applying predetermined pressure to the crimped spring washer.

2. In a trolley system including a bus bar comprising rigid bus bar sections provided with longitudinally extending trolley running surface portions, an expansion joint means for maintaining the bus bar sections in spaced end-to-end relation and in longitudinal alignment, and with the trolley running surface portions thereof in substantial coplanar relation, said expansion joint means including clamping plates respectively secured to opposite sides of adjacent bus bar sections and each plate having a portion in sliding engagement with the corresponding side face of an adjacent bus bar section, said clamping plates extending across the space between the adjacent ends of adjacent bus bar sections, the adjacent ends of adjacent bus bar sections being reversely bevelled to provide end edges diverging outwardly with respect to the trolley running surface portions of said sections and defining a tapered space between the adjacent ends of the adjacent sections, and fastening means extending through said clamping plates for forcing said clamping plates together and into snug sliding engagement with the respective opposite sides of the bus bar sections, said fastening means being located in and extending transversely through said tapered space between the adjacent ends of adjacent bus bar sections, and shunt wires interconnecting said plates.

3. A trolley system as defined in claim 2 in which an elongated opening is provided in one of said clamping plates and wherein said fastening means comprises a stud rigidly secured to the other clamping plate and passing through said elongated opening in said one clamping plate, a spring washer surrounding said stud and positioned thereon between the outer end thereof and the adjacent side of said one clamping plate and a nut on said stud for exerting pressure on said washer to yieldingly force the plates together.

4. In a trolley system including a bus bar comprising rigid bus bar sections provided with longitudinally extending trolley running surfaces, an expansion joint means for maintaining the bus bar sections in spaced end-to-end relation with the sections in longitudinal alignment and with the trolley running surface portions thereof in substantially coplanar relation, said expansion joint means including clamping plates disposed on opposite sides of the bus bar sections, said bus bar sections being provided with bolt receiving apertures, one of said clamping plates being provided with apertures aligned with the apertures in one of said bus bar sections and secured to said one bus bar section only by headed bolt members passing through the aligned apertures in said one bus bar section and in said one clamping plate, said one clamping plate having a free end portion extending across the space between said one bus bar section and an adjacent bus bar section and slidingly engaging the corresponding side of the adjacent bus bar section, another of said clamping plates being provided with apertures aligned with the apertures in said adjacent bus bar section and secured to the opposite side of said adjacent bus bar section by headed bolts passing through said aligned apertures in said adjacent bus bar section and in said another clamping plate, said another clamping plate having a free end portion extending across the space between said bus bar sections and slidingly engaging the corresponding side of said adjacent bus bar section, said free end portions of said clamping plates being provided with bolt head receiving recesses on the sides thereof which are in sliding engagement with the respective sides of the bus bar sections, said recesses being positioned to freely receive the said headed bolt members, and means engaging the clamping plates for yieldingly urging the same into snug sliding contact with the opposite sides of the bus bar sections respectively.

5. The trolley system described in claim 4 wherein the bolt heads and the bolt head receiving recesses are dimensioned to insure that the outer extremities of the bolt heads lie inwardly of the outer sides of the clamping plates.

References Cited in the file of this patent
UNITED STATES PATENTS

| | | |
|---|---|---|
| 391,625 | Lee | Oct. 23, 1888 |
| 597,949 | Bryan | Jan. 25, 1898 |
| 797,426 | Hachmann | Aug. 15, 1905 |
| 1,009,166 | Milliken | Nov. 21, 1911 |
| 1,172,009 | Compton | Feb. 15, 1916 |
| 1,336,940 | Brown | Apr. 13, 1920 |
| 1,562,182 | Myers | Nov. 17, 1925 |
| 1,586,081 | Ganime et al. | May 25, 1926 |
| 1,623,694 | Matthes | Apr. 5, 1927 |
| 1,759,567 | Dibner | May 20, 1930 |
| 1,844,689 | Schaake | Feb. 9, 1932 |
| 2,187,309 | Genter | Jan. 16, 1940 |
| 2,269,493 | Thomas | Jan. 13, 1942 |
| 2,668,199 | Connell | Feb. 2, 1954 |

FOREIGN PATENTS

| | | |
|---|---|---|
| 357,362 | Great Britain | Sept. 24, 1931 |